(12) United States Patent
Muramatsu et al.

(10) Patent No.: US 12,510,583 B2
(45) Date of Patent: Dec. 30, 2025

(54) STATE DETERMINATION DEVICE AND VEHICLE

(71) Applicant: DENSO CORPORATION, Kariya (JP)

(72) Inventors: Junya Muramatsu, Nagakute (JP);
Ryosuke Okachi, Nagakute (JP);
Katsuhiro Kutsuki, Nagakute (JP);
Takashi Tominaga, Nagakute (JP);
Masataka Deguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 18/461,876

(22) Filed: Sep. 6, 2023

(65) Prior Publication Data

US 2023/0408572 A1    Dec. 21, 2023

Related U.S. Application Data

(63) Continuation of application No. PCT/JP2022/005569, filed on Feb. 14, 2022.

(30) Foreign Application Priority Data

Mar. 8, 2021 (JP) .................................. 2021-036773

(51) Int. Cl.
*G01R 31/26* (2020.01)
(52) U.S. Cl.
CPC ................. *G01R 31/2619* (2013.01)
(58) Field of Classification Search
CPC ............ G01R 31/2619; G01R 31/2621; G01R 31/2628; G01R 31/2642; G01R 31/2608; G01R 31/40; G01R 19/0092; G01R 19/0046; G01R 31/26; G01R 31/3277; H02H 7/222; H02H 7/205; H02H 5/044; H02H 7/1225; H02H 5/04
See application file for complete search history.

(56) References Cited

U.S. PATENT DOCUMENTS

| | | | | |
|---|---|---|---|---|
| 8,027,132 B2 * | 9/2011 | Omaru | ................. | H02H 7/1225 |
| | | | | 361/93.1 |
| 8,072,241 B2 * | 12/2011 | Kouno | ............... | H03K 17/0828 |
| | | | | 326/118 |
| 8,325,452 B2 * | 12/2012 | Ichikawa | ........... | H03K 17/0822 |
| | | | | 361/93.8 |
| 9,874,614 B2 * | 1/2018 | Osanai | ................... | G01R 31/42 |
| 11,217,986 B2 * | 1/2022 | Goto | ....................... | H02H 7/222 |
| 2017/0192049 A1 | 7/2017 | Tavernier et al. | | |
| 2018/0074096 A1 | 3/2018 | Absher et al. | | |

(Continued)

FOREIGN PATENT DOCUMENTS

| | | | |
|---|---|---|---|
| JP | 2003-143833 A | 5/2003 | |
| JP | 2014-235060 A | 12/2014 | |

(Continued)

*Primary Examiner* — Vinh P Nguyen
(74) *Attorney, Agent, or Firm* — Oliff PLC (57) ABSTRACT

A state determination device includes an initial waveform storage unit, a waveform acquisition unit, an element temperature acquisition unit, a past waveform storage unit, and a failure state determination unit. The failure state determination unit classifies the time waveform based on the initial time waveform of the gate voltage, the current time waveform of the gate voltage, the element temperature, and the past time waveform of the gate voltage, and determines a fault condition of the IGBT.

10 Claims, 9 Drawing Sheets

(56) References Cited

U.S. PATENT DOCUMENTS

2020/0209282 A1 7/2020 Absher et al.
2021/0011079 A1 1/2021 Ewanchuk

FOREIGN PATENT DOCUMENTS

| JP | 2016-118399 A | 6/2016 |
| JP | 2016-142698 A | 8/2016 |
| JP | 2019-113463 A | 7/2019 |

* cited by examiner

STATE DETERMINATION DEVICE AND VEHICLE

CROSS REFERENCE TO RELATED APPLICATIONS

The present application is a continuation application of International Patent Application No. PCT/JP2022/005569 filed on Feb. 14, 2022, which designated the U.S. and is based on and claims the benefit of priority from Japanese Patent Application No. 2021-36773 filed on Mar. 8, 2021, and all the contents of the application are incorporated by reference.

TECHNICAL FIELD

This disclosure relates to a state determination device that determines state of insulated gate type semiconductor devices.

BACKGROUND

Insulated gate type semiconductor devices such as IGBTs and MOSFETs may have deteriorations of their insulating gate films and interlayer insulating films over time due to loads and may get failure resulting in loss of insulation. Therefore, there are efforts to detect failures in semiconductor devices and to predict failures in advance. In the above aspects, or in other aspects not mentioned, there is a need for further improvements in a state determination device for a semiconductor element having an insulated gate.

SUMMARY

The disclosure discloses a state determination device, comprising a processor circuit, wherein the processor circuit is configured to determine state of a semiconductor element having an insulated gate, and wherein the processor circuit is configured to: acquire, as a gate voltage waveform acquisition unit, a time waveform of a gate voltage during a switching operation of a semiconductor element having an insulated gate; store, as a waveform storage unit, the time waveform of the gate voltage acquired by the gate voltage waveform acquisition unit; and determine, as a state determination unit, a state of an insulating film of the semiconductor element by comparing a past time waveform of the gate voltage stored in the waveform storage unit and a current time waveform of the gate voltage acquired by the gate voltage waveform acquisition unit.

The processor circuit may be further configured to store, as an initial waveform storage unit, an initial time waveform of the gate voltage during the switching operation of the semiconductor element in the initial waveform storage unit. The processor circuit may be configured to determine, as the state determination unit, the state of the insulating film of the semiconductor element by comparing the past time waveform of the gate voltage stored in the waveform storage unit, the current time waveform of the gate voltage acquired by the gate voltage waveform acquisition unit, and the initial time waveform of the gate voltage stored in the initial waveform storage unit.

The processor circuit may be further configured to acquire, as an element temperature acquisition unit, an element temperature during the switching operation of the semiconductor element. The processor circuit may be configured to determine, as the state determination unit, the state of the insulating film of the semiconductor element by considering a correlation between the element temperature acquired by the element temperature acquisition unit and the present time waveform of the gate voltage.

The processor circuit may be configured to classify the time waveforms of the gate voltage into a plurality of types and determine, as the state determination unit, the state of the insulating film of the semiconductor element. A plurality of types may include a normal waveform, which is an initial time waveform of the gate voltage. A plurality of types may include an abnormal waveform that is generated immediately after a normal waveform and has a waveform shape that differ from the normal waveform. A plurality of types may include a transitional waveform where a waveform shape is not stable after an abnormal waveform. A plurality of types may include a stable waveform where a waveform shape is stabilized after a transient waveform.

The processor circuit may be configured to calculate a drop amount of a gate voltage from a normal waveform to an abnormal waveform and determine, as the state determination unit, the state of the insulating film of the semiconductor element based on the drop amount.

The processor circuit may be configured to calculate a number of pulses of a transitional waveform and determine, as the state determination unit, the state of the insulating film of the semiconductor element based on the number of pulses.

The processor circuit may be configured to determine, as the state determination unit, the state of the insulating film of the semiconductor element based on a flatness of the gate voltage in a stable waveform.

The processor circuit may be configured to determine, as the state determination unit, the state of the insulating film of the semiconductor element based on an average value of the gate voltage in a stable waveform.

The state determination unit may determine the state of the insulating film of the semiconductor element based on a variance of the gate voltage in the stable waveform.

This disclosure relates to a vehicle comprising: a semiconductor element having an insulated gate and the state determination device which determines the state of the semiconductor element.

According to this disclosure, it is possible to reduce a circuit scale and improve an accuracy for estimating state of the insulated gate.

BRIEF DESCRIPTION OF DRAWINGS

The disclosure is further described with reference to the accompanying drawings in which.

DETAILED DESCRIPTION

Hereinafter, embodiments of the disclosure are described below with reference to the drawings. The scope of this disclosure is not limited to the embodiments.

JP2014-235060A discloses a failure detection device that predicts failure modes of an actual operation circuit. In JP2014-235060A, the fault detection device has three fault detection circuits having the same structure as the actual operation circuit. The failure detection device has a load circuit applying a load to the failure detection circuit. The failure detection device has a failure determination circuit that measures electrical characteristics of the failure detection circuit and predicts the failure mode of the actual operation circuit based on the measured electrical characteristics.

JP2003-143833A discloses a device that integrates a gate leakage current during switching operations of an IGBT and determines that a failure occurs if the gate leakage current exceeds a threshold value.

However, in the method of JP2014-235060A, it is necessary to apply a load to the failure detection circuit greater than that of the actual operation circuit. Therefore, there is a problem of requiring circuit space and extra power. In addition, since an actual data of the actual operation circuit is not monitored, it is impossible to detect a failure of the failure detection circuit itself. As a result, an accuracy of detecting failure of the actual operation circuit is still low. In addition, it requires a larger circuit scale.

Further, in the method of JP2003-143833A, since the gate leakage current is very small on the order of µA, a separate amplifier circuit is required, and a sensor with a sampling speed on the order of µs is also required. Further, according to teaching in JP2003-143833A, merely two determinations, failure or not failure can be made, and it is impossible to perform a failure classification and a failure prediction.

It is an object of the present disclosure to provide a state determination device, which is a device for estimating a state of an insulated gate type semiconductor device, and which has a small circuit scale and high state estimation accuracy.

First Embodiment

Figure 1:
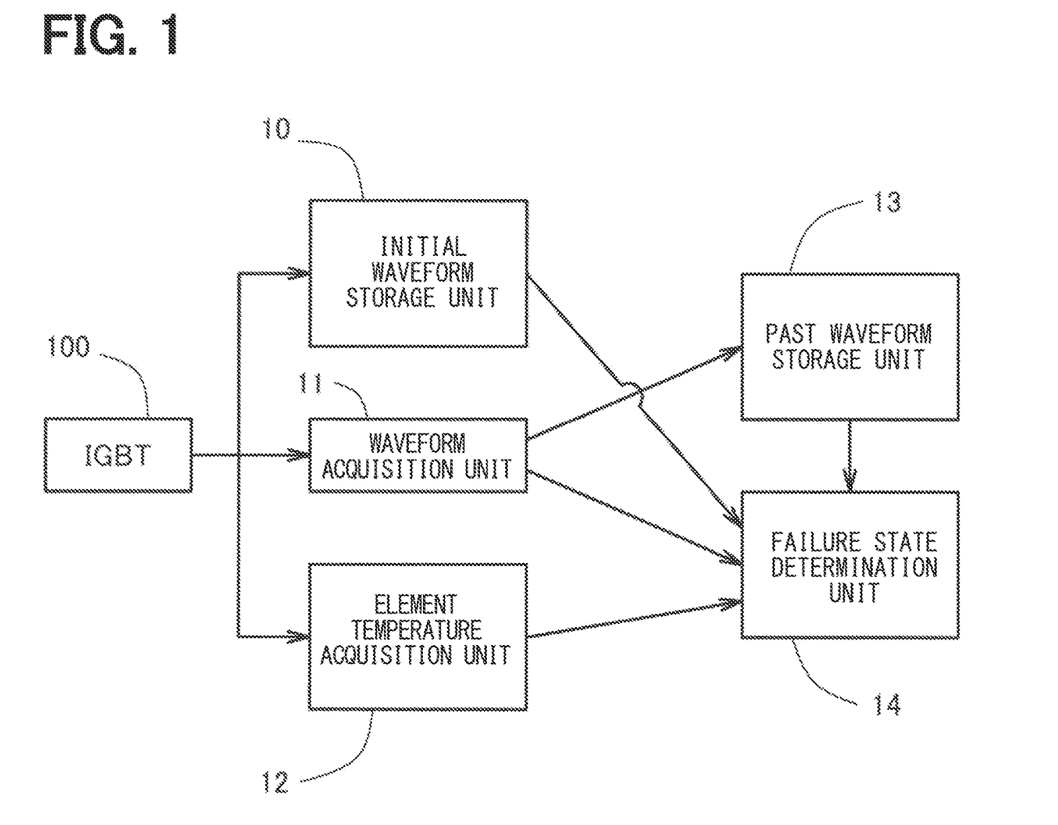
FIG. 1 is a block diagram showing a configuration of a state determination device of a first embodiment.

FIG. 1 shows a configuration of the state determination device of the first embodiment. A state determination device according to the first embodiment is a device that determines a failure state of an in-vehicle IGBT (Insulated Gate Bipolar Transistor) 100. Here, the failure state of the IGBT 100 is specifically the state of the insulating film (the gate insulating film or the interlayer insulating film) of the IGBT, and the associated gate-emitter short circuit state.

(Configuration of State Determination Device)

Next, a configuration of the state determination device according to the first embodiment is described. As shown in FIG. 1, the state determination device of the first embodiment includes an initial waveform storage unit 10, a waveform acquisition unit 11, an element temperature acquisition unit 12, a past waveform storage unit 13, and a failure state determination unit 14. The state determination device of the first embodiment may be collectively mounted in a gate drive circuit of IGBT 100, for example.

The state determination device of the first embodiment is provided by an electronic controller. The controller includes at least one processor circuit. One example of a processor circuit is a processor circuit that executes a program as a collection of a plurality of instructions. The processor circuit is a so-called microprocessor and is provided as a chip. The controller includes at least one non-transitory tangible storage medium for storing a program and data. The storage medium is provided by a semiconductor memory, a magnetic disk memory, or the like. The processor circuit provides functions of the device according to this disclosure by executing a program. Another example of a processor circuit is a processor circuit including a plurality of logic circuits or analog circuits. A plurality of logic circuits or analog circuits are configured to provide a plurality of substantive elements and their electrical connections so as to provide the functions of the apparatus according to this disclosure. A processor circuit may have various names such as an accelerator, a gate array, and an FPGA (Field-programmable gate array). The controller is also called a microcontroller or a microcomputer.

The initial waveform storage unit 10 is a device to acquire and store time waveforms of an initial gate voltage (gate-emitter voltage) when the IGBT 100 is operated in a switching manner at a predetermined frequency f0, a gate voltage V0, and a duty ratio D0. The initial time waveform of the gate voltage may be acquired and stored in advance or may be acquired and stored by the waveform acquisition unit 11. A time waveform includes a plurality of observations observed over a period of time.

The waveform acquisition unit 11 is a device that acquires a current time waveform of the gate voltage when the IGBT 100 is driven in a switching manner. Here, the term "current" refers to any time at which a state determination is made.

The element temperature acquisition unit 12 is a device that acquires a time waveform of an element temperature of the IGBT 100 when the IGBT 100 is driven in a switching manner.

The past waveform storage unit 13 is a device that stores the time waveform of the gate voltage acquired by the waveform acquisition unit 11 and a classification of the time waveform. Classification of time waveforms includes four types including normal waveforms, abnormal waveforms, transitional waveforms, and stable waveforms. Details of the classified time waveforms and characteristics of classification are described later in detail. As the time waveform of the gate voltage, the waveform of at least one pulse before is stored, for example, several tens of pulses before the present are stored.

The failure state determination unit 14 determines failure state of the IGBT 100 based on time waveforms and the element temperature. The time waveforms includes the initial time waveform of the gate voltage stored in the initial waveform storage unit 10, the current time waveform of the gate voltage acquired by the waveform acquisition unit 11, and the past time waveform of the gate voltage stored in the past waveform storage unit 13. The element temperature is acquired by the element temperature acquisition unit 12. The method of determining is described later.

(Relationship Between Time Waveform of Gate Voltage and State of Insulating Film)

Figure 2:
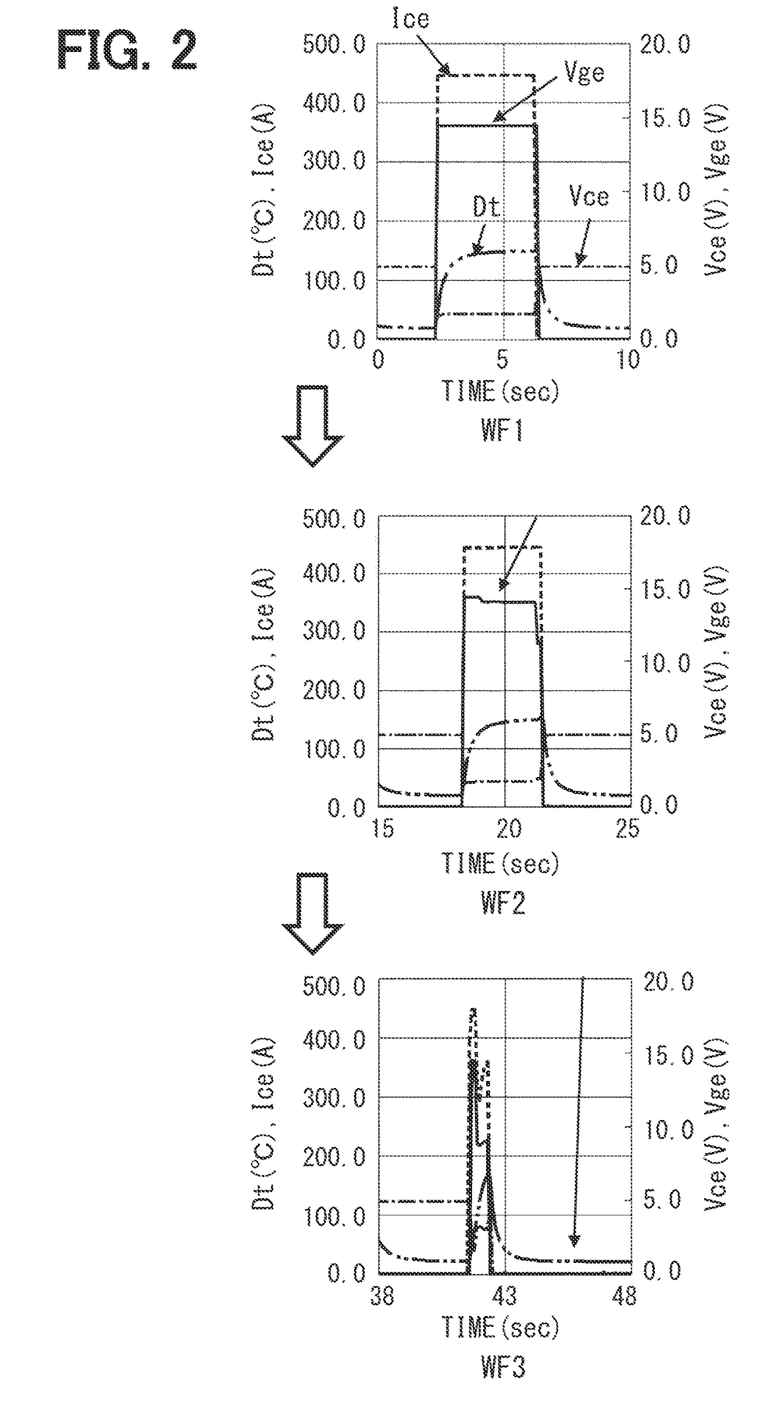
FIG. 2 is a graph showing changes in a switching waveform.

The state determination device of the first embodiment determines the state of the insulating film from the time waveforms of the gate voltage of the IGBT 100. First, a relationship between the time waveform of the gate voltage and the state of the insulating film is described. In FIG. 2, the switching waveform of the IGBT 100 includes an element temperature Dt, a collector-emitter current Ice, a gate voltage Vge, and a collector-emitter voltage Vce. The horizontal axis of FIG. 2 is time. Thick arrows indicate time period corresponding tens of thousands of cycles.

In a power cycle test of the IGBT 100, it is assumed that a case where a switching operation is repeated at a predetermined frequency and a predetermined duty ratio. In this case, no significant change appears on the switching waveforms (a gate voltage, a collector-emitter voltage, an element temperature) of the IGBT 100 for several tens of thousands of cycles from an initial stage. The switching waveforms of the IGBT 100 repeat normal response waveforms. A normal response waveform is illustrated as WF1 in FIG. 2.

Further, it is assumed that a case where switching operations of tens of thousands of cycles are repeated. In this case, the switching waveforms of the IGBT 100 show an abnormal waveform in which the gate voltage sharply drops, or the duty ratio decreases. An abnormal waveform is illustrated as WF2 in FIG. 2. The sharp drop in the gate voltage is represented by an arrow. This abnormal waveform WF2 may recover in several cycles and may return to a stable normal waveform.

It is assumed that a case where switching operations tens of thousands of cycles are repeated further. In this case, the IGBT 100 is irreversibly damaged and cannot perform normal switching operations. A failure waveform is illustrated as WF3 in FIG. 2. After the failure waveform WF3 is observed, that is, after the timing indicated by the arrow, the IGBT 100 falls into a switching impossible state.

Here, a cause of an appearance of the abnormal waveform WF2 in FIG. 2 is considered to be that a momentary short circuit occurs between the gate and the emitter, causing a leakage current to flow and causing a voltage drop. It is considered that a short circuit between the gate and the emitter may caused by some changes in an oxide film (a gate oxide film or an interlayer insulating film) existing between the gate and the emitter. For example, there is a possibility that the oxide film cracked and the electrical breakdown voltage between the gate and the emitter decreased, as a result a leakage current may be generated. In other words, there may be possibilities that the cracks make the oxide film thinner than expected, resulting in increasing of tunneling probabilities of electrons passing through the oxide film and the tunnel current is increased.

One cause of the cracks in the oxide film is a thermal stress due to heat generated when the IGBT 100 is driven. For example, if an IGBT 100 cooled through a single side generates heat, the heat is transmitted to a lower copper plate and the copper plate deforms due to the thermal stress. It is assumed that the stress due to the deformation is transmitted to a semiconductor layer and the insulating film, and a large stress is applied to the hardest part of the insulating film, causing cracks in the insulating film.

Thus, a cause of an appearance of the abnormal waveform is thought to be cracks in the oxide film or the like. However, since this is an irreversible phenomenon, even if the normal switching state is restored after the occurrence of the abnormal waveform, some traces may remain in the switching waveform and changes in electrical characteristics should appear.

Figure 3A:
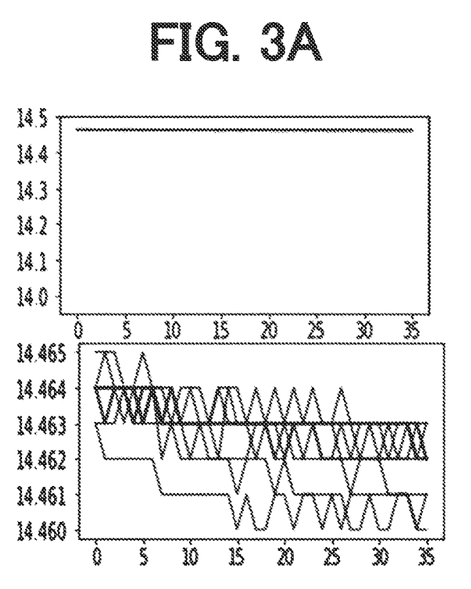
FIG. 3A is graphs showing time waveforms of gate voltages before and after an abnormal waveform.
Figure 3B:
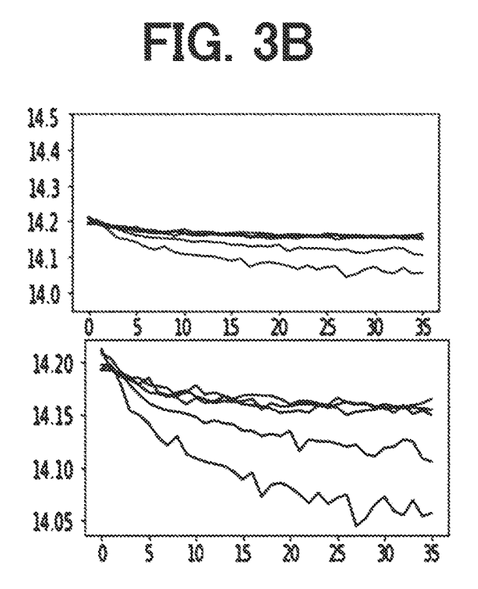
FIG. 3B is graphs showing time waveforms of gate voltages before and after an abnormal waveform.
Figure 3C:
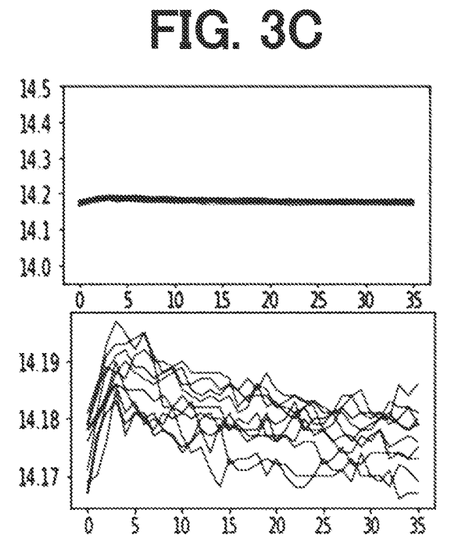
FIG. 3C is graphs showing time waveforms of gate voltages before and after an abnormal waveform.
Figure 3D:
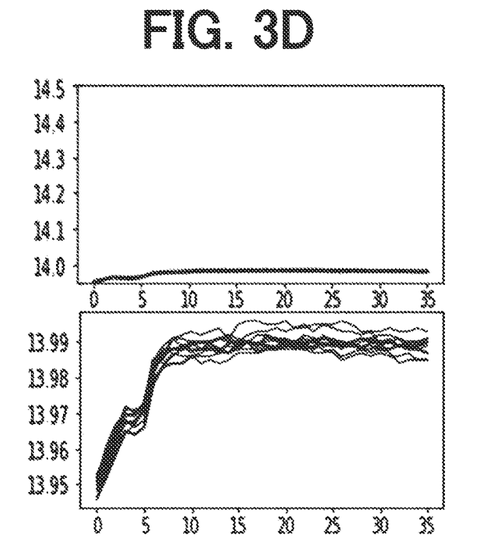
FIG. 3D is graphs showing time waveforms of gate voltages before and after an abnormal waveform.

Therefore, gate voltages when the IGBT 100 is turned on were compared by using a normal waveform before the abnormal waveform was observed and a stable waveform after the abnormal waveform was observed. As a result, the results shown in the graphs of FIGS. 3A, 3B, 3C, and 3D were observed. In FIGS. 3A, 3B, 3C, and 3D, waveforms of a plurality of gate voltages are normalized by the maximum voltage value. Also, the plurality of waveforms in FIGS. 3A, 3B, 3C and 3D indicate portions of one-pulse of an on-drive operation. FIG. 3A is a normal waveform. FIGS. 3B and 3C are transitional period waveforms before the waveforms are stabilized after the on-drive operation. A transitional waveform is observed in a period between the on-drive operation and the stable waveform. FIG. 3D is a stable waveform after the transitional period. FIG. 3D shows the waveform after 1000 pulses from a generation of the abnormal waveform.

As shown in FIGS. 3A, 3B, 3C, and 3D, the gate voltages in the stable waveforms are different from the gate voltages in the normal waveforms. In normal waveforms, the gate voltage is nearly constant. On the other hand, it may be understood that after the generation of the abnormal waveform and after 1000 times of the switching operations, the gate voltage converges to a right-side upward-sloping shape and is stable. That is, the waveform has a shape in which the gate voltage increases and then the gate voltage becomes constant for a period about 0 to 1 s after the IGBT 100 is turned on. In other words, it may be understood that a voltage is fluctuated due to the leakage current flowing through a changing resistance value between the gate and the emitter in the initial stage of turning on, and then is stabilized in a constant state as the leakage current is lowered. An average value Ave, a variance Var, a gradient Gra, and the like of the gate voltage when the IGBT 100 is turned on are conceivable as feature quantities that can explain minute changes between the normal waveform and the stable waveform.

Also, as shown in FIGS. 3B and 3C, the gate voltage is unstable for several tens of pulses after the generation of the abnormal waveform. It is considered that this is because the crack of the insulating film has not settled yet, or the crack is progressing, so that the leakage current is unstable. On the other hand, as shown in FIG. 3D, after 1000 pulses from the generation of the abnormal waveform, the shape of the gate voltage is stable. It is considered that this is because a shape of the crack stabilized, or because the progress of the crack stopped, so that the leakage current stabilized.

(Relationship Between Time Waveform of Gate Voltage and Element Temperature)

Figure 4A:
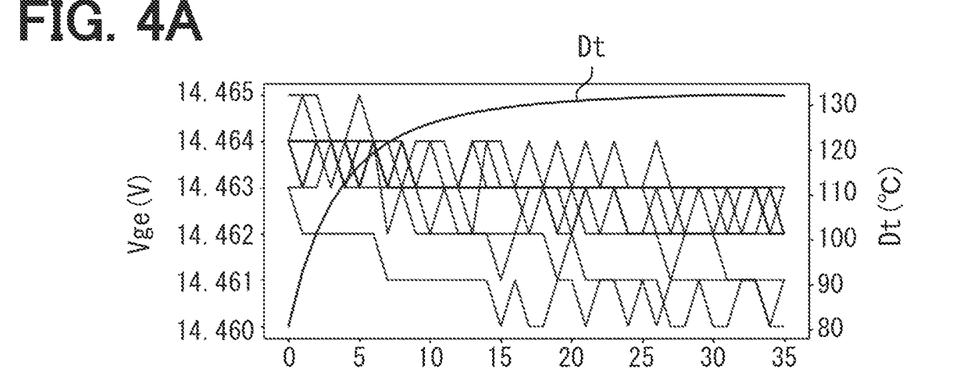
FIG. 4A is graphs showing correlations between the time waveforms of the gate voltages and element temperatures before and after the abnormal waveforms.
Figure 4B:
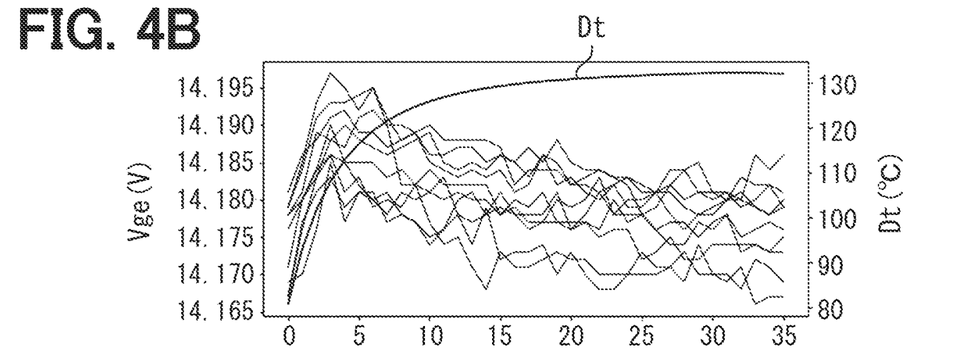
FIG. 4B is graphs showing correlations between the time waveforms of the gate voltages and element temperatures before and after the abnormal waveforms.
Figure 4C:
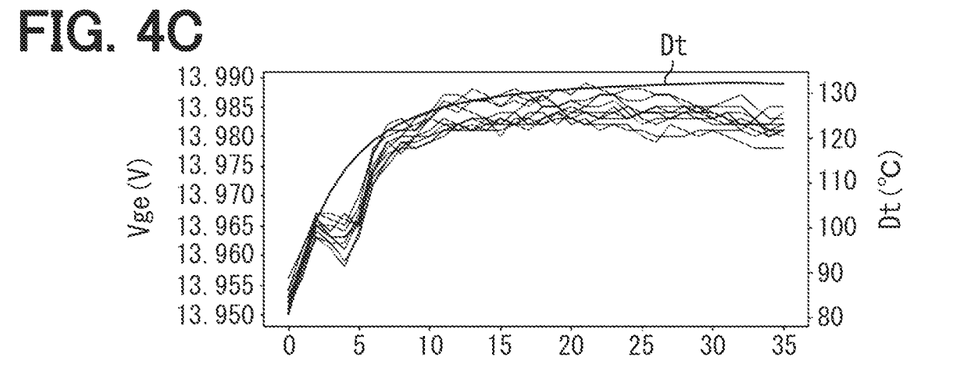
FIG. 4C is graphs showing correlations between the time waveforms of the gate voltages and element temperatures before and after the abnormal waveforms.

FIGS. 4A, 4B, and 4C are graphs showing correlations between the gate voltage and the element temperature when the IGBT 100 is turned on, with a normal waveform before the abnormal waveform is observed and a stable waveform after the abnormal waveform is observed. In FIGS. 4A, 4B, and 4C, the plurality of waveforms are standardized by the gate voltage Vge and the maximum value of the element temperature Dt. Also, FIGS. 4A, 4B, and 4C show the on-drive operations of one pulse. FIG. 4A shows a normal waveform. FIG. 4B shows a waveform 30 pulses after the generation of the abnormal waveform. FIG. 4C shows a stable waveform which is a waveform after 1000 pulses from the generation of the abnormal waveform.

As shown in FIGS. 4A, 4B, and 4C, it is suggested that the gate voltages Vge and the element temperatures Dt have correlations. In particular, in the waveform after 1000 pulses, the element temperature rises greatly in the initial stage of turning on, and the gate voltage also increases greatly in conjunction with this. As a result, it is considered that the change in the element temperature affects the change in the gate voltage. This is probably because the resistance of the electrodes and elements of the IGBT 100 increases due to an increase of the element temperature, or the probability that electrons pass through the insulating film increases due to the tunnel effect.

Figure 5:
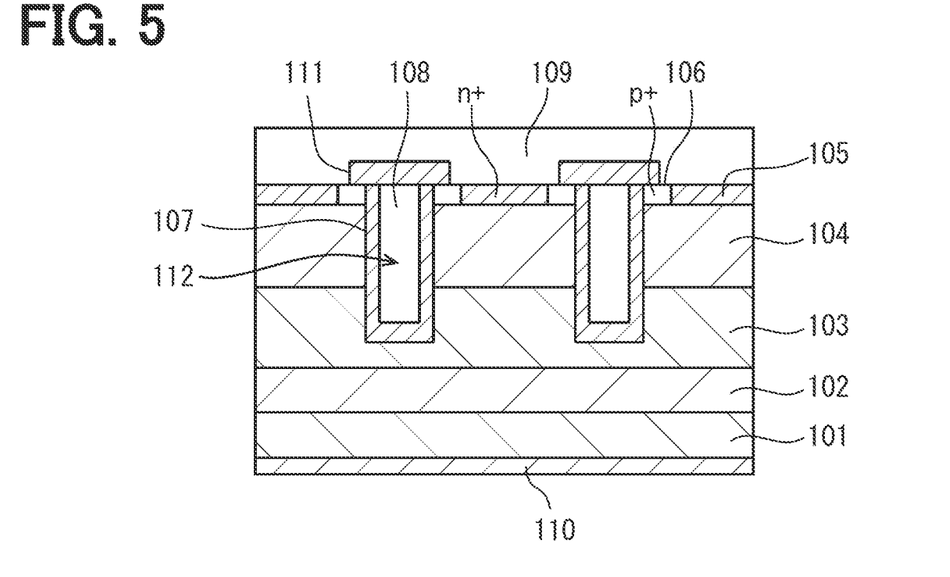
FIG. 5 is a cross-sectional view showing an element structure of an IGBT.

An element structure of the IGBT 100 used for measuring FIGS. 3A, 3B, 3C, 3D, 4A, 4B, and 4C is as shown in FIG. 5. The IGBT 100 has a trench type structure made of Si. The IGBT 100 includes a substrate 101, a p+ layer 102 formed on the substrate 101, an n+ layer 103 formed on the p+ layer, an n− layer 104 formed on the n+ layer 103, and an n+ layer 105 formed on the n− layer 104. The IGBT 100 also has a trench 112 with a depth reaching the n− layer 103, and a gate insulating film 107 is formed in a film shape from a bottom to a side of the trench 112. The trench 112 is filled with the gate electrode 108 with the gate insulating film 107 interposed therebetween. A region of the n+ layer 105 near the trench 112 is provided with a p+ region 106. An interlayer insulating film 111 is provided over the gate electrode 108 and the p+ region 106. A collector electrode 110 is provided on a back surface of the substrate 101. An emitter electrode 109 is provided over the interlayer insulating film 111, the p+ region 106 and the n+ layer 105.

(Method for Determining State of Insulating Film)

As described above, it may be understood that information on the state of the insulating film (cause of a current leakage) is included in the time waveform of the gate voltage and the change in the element temperature after the generation of the abnormal waveform. The state determination device of the first embodiment uses this to determine the state of the insulating film of the IGBT 100. The determination method is described below.

Figure 6:
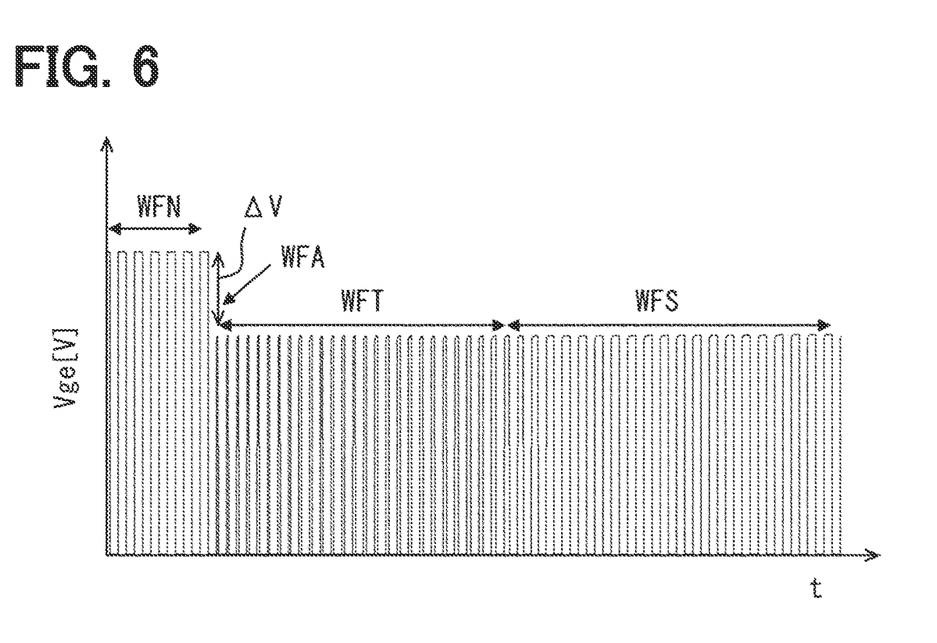
FIG. 6 is a graph showing changes in the time waveform of the gate voltage.

The state estimating device of the first embodiment drives the IGBT 100 in a switching manner and monitors a current time waveform of the gate voltage (a waveform for one pulse). Furthermore, in the state estimation device of the first embodiment, the observed time waveforms are identified and classified into four types including a normal waveform, an abnormal waveform, a transitional waveform, and a stable waveform. The normal waveform is the time waveform of the gate voltage at an initial stage. The abnormal waveform is a waveform that is generated immediately after the normal waveform or the stable waveform and is changed with respect to the normal waveform or the stable waveform. If an abnormal waveform is generated, a stable waveform appears after a transitional waveform. As shown in FIG. 6, the time waveform of the gate voltage Vge is the normal waveform WFN before the abnormal waveform WFA is generated. Immediately after the generation of the abnormal waveform WFA, the duty ratio may become small, or the gate voltage at an on operation period decreases by IN. After that, a transitional waveform WFT in which the time waveform fluctuates is observed, and eventually the fluctuation of the time waveform subsides and a stable waveform WFS is observed.

(Time Waveform Classification)

In the first embodiment, the time waveform observed when the IGBT 100 is operated in a switching manner is divided into a plurality of waveform periods. Multiple waveform periods may be classified into four types. Four types of time waveforms may be characterized based on the period after the switching operation. A classification of the time waveforms is performed based on an initial time waveform of the gate voltage stored in the initial waveform storage unit 10, a one pulse previous time waveform of the gate voltage before the current time stored in the past waveform storage unit 13, and a present time waveform of the gate voltage acquired by the time waveform acquisition unit 11. For example, classification is performed by the flowchart of FIG. 7.

First, the waveform acquisition unit 11 acquires the current time waveform of the gate voltage during the switching operation of the IGBT 100. Further, the element temperature of the IGBT 100 is acquired by the element temperature acquisition unit 12 (a step S1 in FIG. 7).

Next, the failure state determination unit 14 compares the current time waveform of the gate voltage acquired in a step S1 with the one pulse previous time waveform of the gate voltage stored in the past waveform storage unit 13. The failure state determination unit 14 determines whether there is a difference between the two (a step S2 in FIG. 7).

If it is determined that there is no difference between the current time waveform of the gate voltage and the one pulse previous time waveform of the gate voltage stored in the past waveform storage unit 13, the flowchart branches from the step S2 to NO. The failure state determination unit 14 compares the current time waveform of the gate voltage with the initial time waveform of the gate voltage stored in the initial waveform storage unit 10. The failure state determination unit 14 determines whether there is a difference between the two (a step S3 in FIG. 7).

Figure 7:
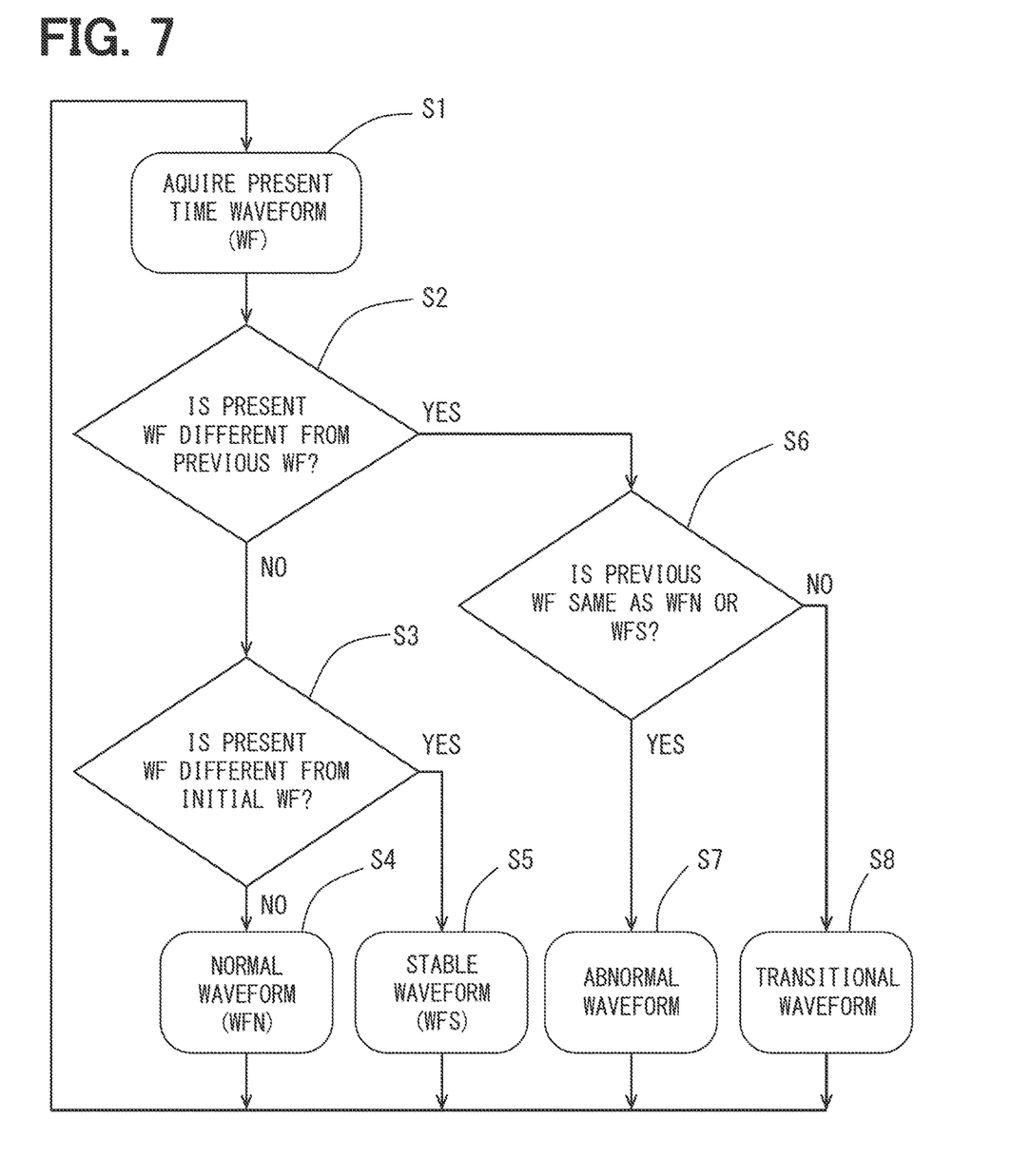
FIG. 7 is a flow chart for classifying time waveforms of gate voltages.

Determination of the difference in the steps S2 and S3 is performed, for example, if the mean square error for each time between the current time waveform of the gate voltage and the one pulse previous time waveform of the gate voltage is equal to or greater than a threshold value, it is determined that there is a difference.

If it is determined that there is no difference between the current time waveform of the gate voltage and the one pulse previous time waveform of the gate voltage stored in the past waveform storage unit 13, the flowchart branches from the step S3 to NO. The failure state determination unit 14 determines that the current time waveform of the gate voltage is a normal waveform (a step S4 in FIG. 7). The failure state determination unit 14 stores the current time waveform of the gate voltage and information indicative of that time waveform is the normal waveform in the past waveform storage unit 13.

On the other hand, if it is determined that there is a difference between the current time waveform of the gate voltage and the initial time waveform of the gate voltage stored in the past waveform storage unit 13, the flowchart branches from the step S3 to YES. The failure state determination unit 14 determines that the current time waveform of the gate voltage is a stable waveform (a step S5 in FIG. 7). The failure state determination unit 14 stores the current time waveform of the gate voltage and information indicative of that time waveform is the stable waveform in the past waveform storage unit 13.

If it is determined that there is difference between the current time waveform of the gate voltage and the one pulse previous time waveform of the gate voltage stored in the past waveform storage unit 13, the flowchart branches from the step S2 to YES. The failure state determination unit 14 determines that whether or not the one pulse previous time waveform of the gate voltage was a normal waveform or a stable waveform based on information stored in the waveform storage unit 13 (a step S6 in FIG. 7).

If the one pulse previous time waveform of the gate voltage is a normal waveform or a stable waveform, the flowchart branches from the step S6 to YES. The failure state determination unit 14 determines that the current time waveform of the gate voltage is an abnormal waveform (a step S7 in FIG. 7). The failure state determination unit 14 stores the current time waveform of the gate voltage and information indicative of that time waveform is the abnormal waveform in the past waveform storage unit 13.

If the one pulse previous time waveform of the gate voltage is not a normal waveform or a stable waveform, the flowchart branches from the step S6 to NO. The failure state determination unit 14 determines that the current time waveform of the gate voltage is a transitional waveform (a step S8 in FIG. 7). The failure state determination unit 14 stores the current time waveform of the gate voltage and information indicative of that time waveform is the abnormal waveform in the past waveform storage unit 13.

As described above, the failure state determination unit 14 determines whether the current time waveform of the gate voltage is a normal waveform, an abnormal waveform, a transient waveform, or a stable waveform. Alternatively, the time waveforms may be classified by preparing and storing in a waveform map in advance, and time waveforms may be classified by a general clustering method using the k-nearest neighbor method, or the time waveforms may be classified by using deep learning. Of course, a plurality of methods may be combined for classification.

Further, the classification of the time waveform is repeatedly performed for each pulse of the gate voltage. As a result, the time waveform can be accurately classified for each one of pulses. However, the classification may be performed at regular intervals, for example, at intervals of several pulses or tens of pulses. In this case, there is a possibility that abnormal waveforms and transitional waveforms cannot be detected, but normal waveforms and stable waveforms can be detected, and the generation of abnormal waveforms can be detected.

(Determining State of Insulating Film)

Next, the failure state determination unit 14 determines the state of the insulating film and the failure risk of the IGBT 100 based on the classification of the current time waveform of the gate voltage.

If the current time waveform of the gate voltage is a normal waveform, the failure state determination unit 14 determines that no state change has occurred in the insulating film of the IGBT 100. Further, the failure state determination unit 14 determines that the failure risk of the IGBT 100 is also low.

If the current time waveform of the gate voltage is the abnormal waveform, the failure state determination unit 14 calculates the maximum value ΔV of the voltage drop amount from the initial time waveform of the gate voltage (the normal waveform) (see FIG. 7). From the maximum value of this voltage drop amount, the magnitude of the leakage current may be known, and the depth of the crack generated in the insulating film can be estimated. This means that the greater the depth of the crack in the oxide film, the greater an amount of the leakage current due to the tunneling effect, so the greater the drop in voltage amplitude, the greater the possibility that the crack in the insulating film is deeper.

For example, if the voltage drop is 10% or less with respect to a normal waveform, it may be estimated that the crack in the insulating film is shallow. If the voltage drop is greater than 10% and less than or equal to 30%, it may be estimated that the crack in the insulating film is moderate. If the voltage drop is greater than 30%, it may be estimated that the crack in the insulating film is deep. Further, if the voltage drop is 50% or more, it may be estimated that the IGBT 100 has already failed. Further, for example, the number of times the abnormal waveforms appear may be stored for each depth of the cracks in the insulating film, and if the number exceeds a predetermined number, it may be determined that the IGBT 100 has a high failure risk. Of course, the failure risk may be determined simply by the number of times the abnormal waveforms appear.

If the current time waveform of the gate voltage is a transitional waveform, the failure state determination unit 14 counts how many consecutive pulses of the transitional waveforms and stores the number in the past waveform storage unit 13. That is, the failure state determination unit 14 counts the number of pulses from the next pulse of the abnormal waveform to the pulse one before the pulse of the stable waveform. The number of consecutive pulses in the transitional waveform can be used as an index of a stability of the cracked portion of the insulating film. This stability is an index of a vulnerability to stress at the cracked portion of the insulating film. It is considered that the greater the number of consecutive pulses in the transitional waveform, the lower the stability and the weaker the stress at the cracked portion of the insulating film. For example, the failure state determination unit 14 determines that the failure risk of the IGBT 100 is high if the number of consecutive pulses of the transient waveform is equal to or greater than a predetermined threshold. Further, if the transition from the transitional waveform to the stable waveform does not occur, the fault state determination unit 14 may determine that the IGBT 100 is faulty.

If the current time waveform of the gate voltage is a stable waveform, the failure state determination unit 14 makes the following determination based on a shape of the stable waveform. The failure state determination unit 14 may determine, as the state determination unit, the state of the insulating film of the semiconductor element based on a flatness of the gate voltage in a stable waveform.

With respect to the current time waveform of the gate voltage, the failure state determination unit 14 determines whether the gate voltage is flat. Whether or not it is flat is determined by, for example, a difference between a maximum and a minimum voltage values at the on operation period.

Figure 8:
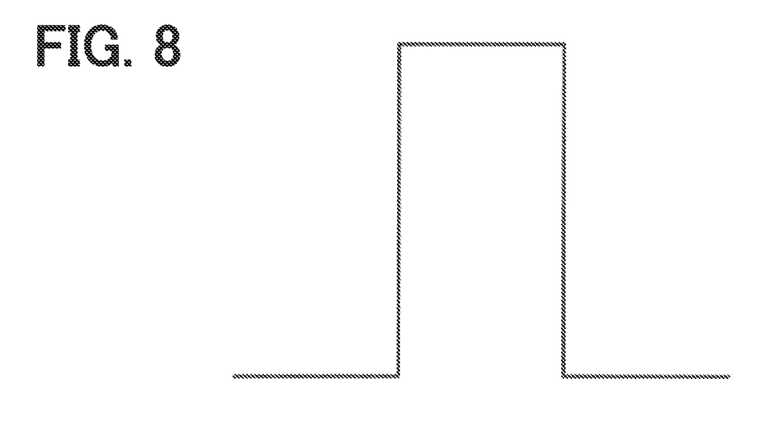
FIG. 8 is a graph showing changes in the time waveform of the gate voltage.

If the gate voltage is flat at the on operation period (see FIG. 8), it is considered that a leakage current independent of a temperature is generated. It is considered that this is because the state of the crack in the insulating film does not depend on a temperature change and does not change. As a cause of such leakage current, it is conceivable that a clear leak path is generated, for example.

If the gate voltage is not flat at the on operation period, the failure state determination unit 14 determines the correlation between the element temperature acquired by the element temperature acquisition unit 12 and the current time waveform of the gate voltage.

Figure 9:
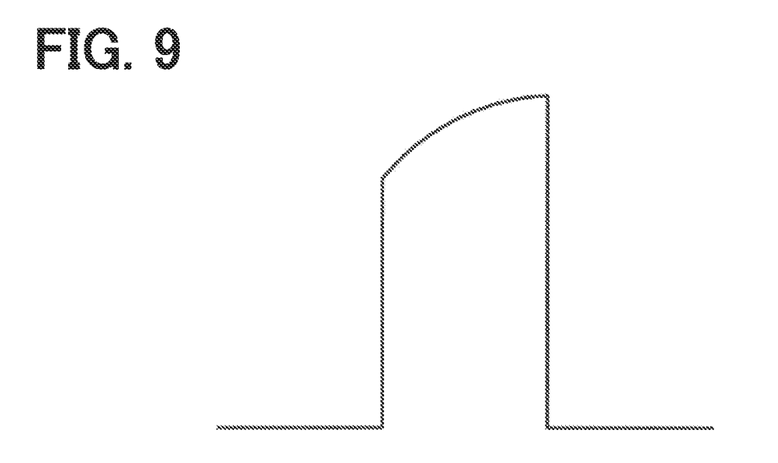
FIG. 9 is a graph showing changes in the time waveform of the gate voltage.

If the current time waveform of the gate voltage has a positive correlation with the element temperature, the gate voltage at the on operation period has a right-side upward-sloping shape (see FIG. 9). In this case, the failure state determination unit 14 determines that the resistance value of the electrode or the element itself of the IGBT 100 increases as the element temperature rises.

Figure 10:
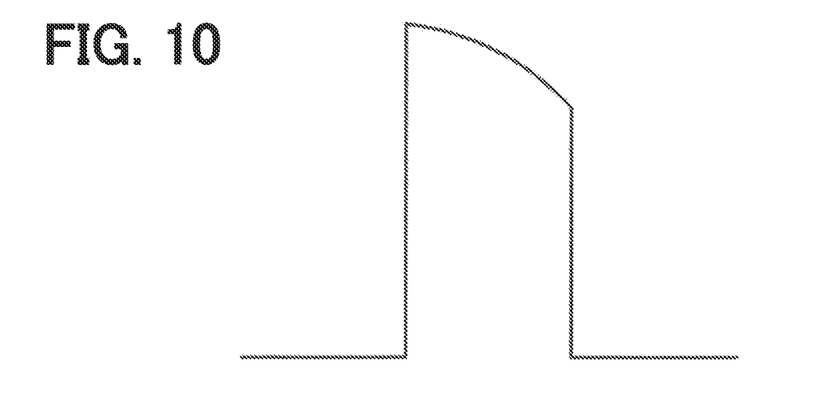
FIG. 10 is a graph showing changes in the time waveform of the gate voltage.

On the other hand, if the current time waveform of the gate voltage has a negative correlation with the element temperature, the gate voltage at the on operation period has a right-side downward-sloping shape (see FIG. 10). In this case, the failure state determination unit 14 may determine whether the leakage current is due to the thermionic emission or the Poole-Frankel effect from the drop in the gate voltage. If a width of a decrease is small, it means that an increase in the leakage current due to a rise in the element temperature is small, and it may be estimated that this is due to the Poole-Frankel effect. On the other hand, if a width of a decrease is large, it means that the leak current is greatly increased due to a rise of the element temperature, as a result it may be estimated that this is due to the influence of the thermionic emission.

Figure 11:
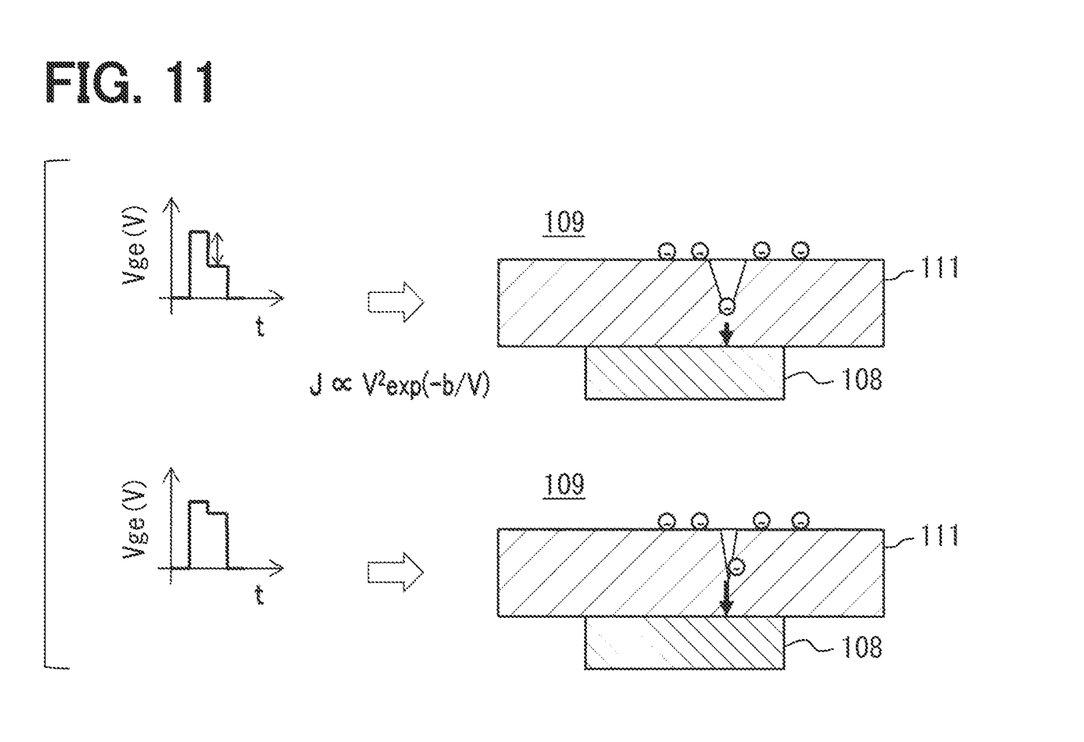
FIG. 11 is a diagram showing a correspondence between an amplitude change in the gate voltage and a state of a crack.

Further, if the gate voltage is not flat, the failure state determination unit 14 determines a depth of a crack in the insulating film from an amount of change in the amplitude of the gate voltage (a difference between a maximum and a minimum of voltage values at the on operation period) (see FIG. 11). The deeper the crack in the insulating film, the thinner the insulating film at that point and the greater the leakage current due to the tunnel effect. Therefore, it is considered that the larger the amount of change in the amplitude of the gate voltage, the deeper the crack in the insulating film.

The graph on the upper left side of FIG. 11 shows a case where the amplitude change of the gate voltage Vge is large. In this case, as shown in the cross-sectional view on the upper right side of FIG. 11, it may be assumed that a relatively large crack is generated in the interlayer insulating film 111. In the equation illustrated in FIG. 11, "J" represents a current density, "V" represents a gate voltage, and "b" represents a constant. In this state, the charges accumulated at the interface reach relatively deep sites via relatively large cracks. In this state, it is assumed that the tunneling current is relatively large and the voltage is relatively low at a vicinity of the crack. The graph on the lower left side of FIG. 11 shows a case where the amplitude change of the gate voltage Vge is small. In this case, as shown in the cross-sectional view on the lower right side of FIG. 11, it may be assumed that a relatively small crack is generated in the interlayer insulating film 111. In this state, the charges accumulated at the interface remain in relatively small cracks and relatively shallow sites. In this condition, it is assumed that the tunneling current is relatively small and the voltage is relatively high at the vicinity of the crack.

Figure 12:
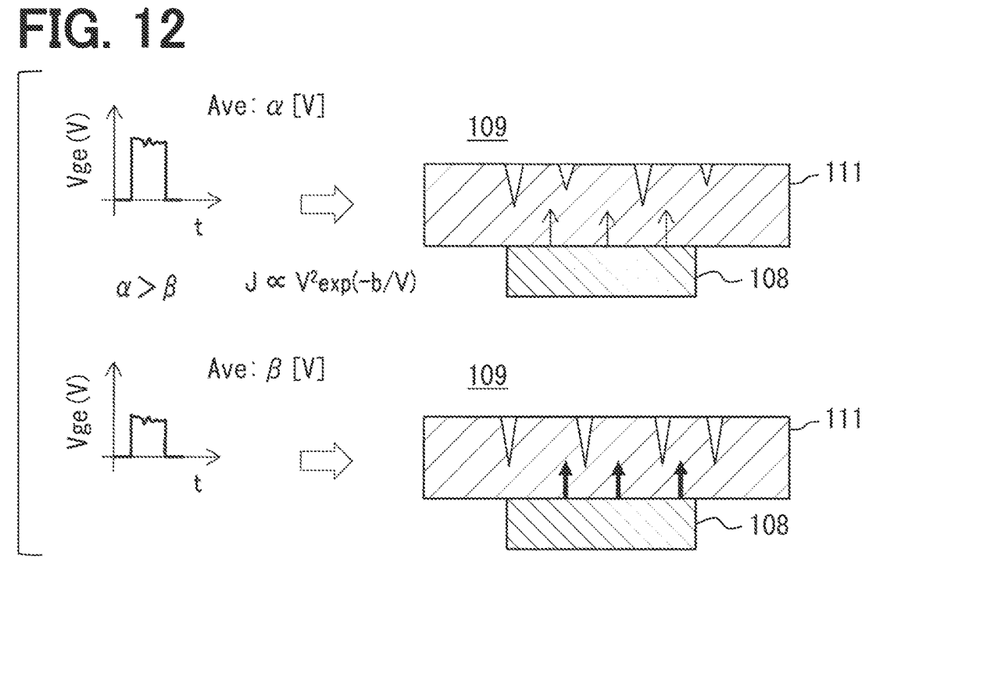
FIG. 12 is a diagram showing a correspondence between average values of gate voltages and a state of cracks.

In addition, a macroscopic progressive degree of cracks in the entire insulating film may be determined from the average value Ave of the gate voltages at the on operation period (see FIG. 12). It is considered that the lower the average value Ave of the gate voltage, the more the macroscopic progressive degree of cracks in the entire insulating film. For example, if the average value Ave decreases by 10% or less with respect to the normal waveform, it may be determined that the progressive degree of cracks is low. If the average value Ave is more than 10% and less than or equal to 30%, it may be determined that the progressive degree of cracks is moderate. If the average value Ave is a voltage drop greater than 30%, it may be determined that the progressive degree of cracks is high. Also, if the average value Ave is decreased by 50% or more, it may be determined that the IGBT 100 has already failed.

The graph on the upper left side of FIG. 12 shows a case where the average value Ave of the gate voltage Vge is relatively large. For example, the average value Ave is a (alpha) (V). In this case, as shown in the cross-sectional view on the upper right side of FIG. 12, it is assumed that a crack of a predetermined size is generated in the interlayer insulating film 111. In this state, the leakage current is assumed to be relatively small. The graph on the lower left side of FIG. 12 shows a case where the average value Ave of the gate voltage Vge is relatively small. For example, the average value Ave is β (beta) (V). The average value α is greater than the average value β (α>β). In this case, as shown in the cross-sectional view on the lower left side of FIG. 12, it may be assumed that a crack is larger and progresses deeper than the crack in the upper side. It is assumed that a large and deeply progressive crack is generated in the interlayer insulating film 111. In this state, the leakage current is increased from the state in the upper side. In this state, the leakage current is assumed to be relatively large.

Figure 13:
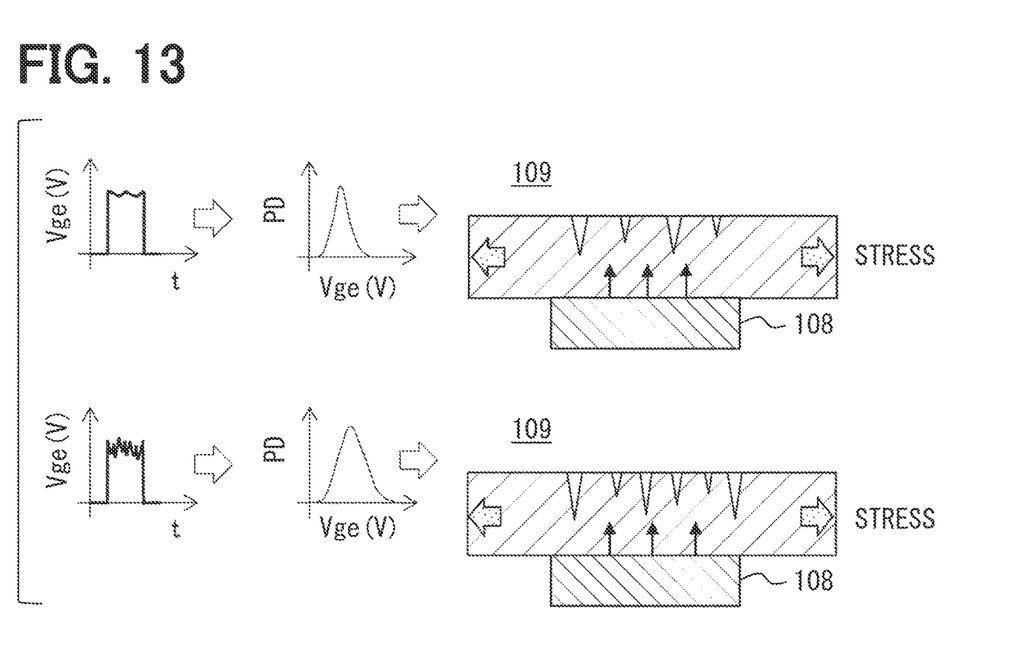
FIG. 13 is a diagram showing a correspondence between a variance in the gate voltage and a state of cracks.

In addition, the failure state determination unit 14 determines patterns and scales of cracks in the oxide film based on the magnitude of the variance Var of the gate voltage at the on operation period (see FIG. 13). It is considered that the larger the variance Var is, the more cracks of various sizes are generated at various locations.

The graph on the upper left side of FIG. 13 shows the case where the variance Var of the gate voltage Vge is relatively small. In this case, as shown in the cross-sectional view on the upper right side of FIG. 13, it is assumed that a predetermined number of cracks are generated in the interlayer insulating film 111. In this state, it is assumed that a change in the leakage current is relatively small. The graph on the lower left side of FIG. 13 shows the case where the variance Var of the gate voltage Vge is relatively large. The graph on the upper center and the graph on the lower center of FIG. 13 show the probability density PD of the observed gate voltage Vge. A difference between the waveform in the upper middle row and the waveform in the lower middle row in FIG. 13 indicates that the variance Var in the lower row is greater than the variance Var in the upper row. In this case, as shown in the cross-sectional view on the lower left side of FIG. 13, more cracks than the cracks on the upper side may be assumed. In this state, it is assumed that a change in the leakage current is relatively large.

As described above, the state estimating apparatus of the first embodiment observes changes in the time waveform of the gate voltage that change minutely due to cracks in the insulating film that do not lead to failure and determines the state of the insulating film and the failure based on this observed changes in the time waveform of the gate voltage. Therefore, it is possible to reduce the circuit scale, and the state of the insulating film and the failure may be determined with high accuracy. As a result, it is possible to change an operation of the IGBT 100 to be equivalent to a normal operation by changing a switching frequency or changing an applied voltage, to estimate the life of the element of the IGBT 100, or to determine a priority of necessary maintenance.

The first embodiment determines the failure state of the IGBT100. Alternatively, this disclosure is not limited to the IGBT 100, but may be applied to any insulated gate type semiconductor devices. For example, this disclosure may also be applied to FETs, HFETs, and the like. Also, a semiconductor material is not limited to Si, and any material may be used, and the material of the gate insulating film and the interlayer insulating film is not limited to SiO2 and may be arbitrary.

Further, in the first embodiment, the state of the insulating film and the failure are determined by considering three time waveforms of the gate voltage including the initial stage, the current stage, and the past stage, and the element temperature. Alternatively, the initial time waveform of the gate voltage and the element temperature may not necessarily be considered. Further, the state of the insulating film and the failure may be determined by further considering a collector-emitter voltage, a collector-emitter current, and the like.

The state determination device of the first embodiment is mounted on a vehicle, for example, and may be used to determine state or failure of an insulating film of an IGBT for a drive motor of the vehicle. In that case, a part or all of the configuration of the state estimation device of the first embodiment may be implemented in a control ECU of the IGBT 100 or may be implemented in a higher level control ECU. For example, the initial waveform storage unit 10, the past waveform storage unit 13, and the failure state determination unit 14 in the state estimation device of the first embodiment may be implemented in the higher level control ECU higher than the control ECU for the IGBT 100, and the waveform acquisition unit 11 and the element temperature acquisition unit 12 may be implemented inside the control ECU of the IGBT 100. Of course, this disclosure may also be applied to the determination of the state of an insulated gate type semiconductor device that is used in applications other than vehicles.

The state determination device disclosed in this disclosure may be used for estimating the life of a semiconductor element, determining maintenance timing, and the like.

What is claimed is:

1. A state determination device, comprising a processor circuit configured to:
    acquire, as a gate voltage waveform acquisition unit, a time waveform of a gate voltage during a switching operation of a semiconductor element having an insulated gate;
    store, as a past waveform storage unit, the time waveform of the gate voltage acquired by the gate voltage waveform acquisition unit;
    classify time waveforms of the gate voltage into four types including:
        a normal waveform which is an initial time waveform of the gate voltage,
        an abnormal waveform which is generated immediately after the normal waveform and has a waveform shape different from the normal waveform,
        a transitional waveform which has a waveform shape still unstable after the abnormal waveform, and
        a stable waveform which has a waveform stable shape after the transitional waveform; and
    determine, as a state determination unit, a state of an insulating film of the semiconductor element by comparing a past time waveform of the gate voltage stored in the past waveform storage unit and a current time waveform of the gate voltage acquired by the gate voltage waveform acquisition unit.

2. The state determination device according to claim 1, wherein
    the processor circuit is further configured to store, as an initial waveform storage unit, an initial time waveform of the gate voltage during the switching operation of the semiconductor element in the initial waveform storage unit, and wherein
    the processor circuit is configured to determine, as the state determination unit, the state of the insulating film of the semiconductor element by comparing the past time waveform of the gate voltage stored in the past waveform storage unit, the current time waveform of the gate voltage acquired by the gate voltage waveform acquisition unit, and the initial time waveform of the gate voltage stored in the initial waveform storage unit.

3. The state determination device according to claim 1, wherein
    the processor circuit is further configured to acquire, as an element temperature acquisition unit, an element temperature during the switching operation of the semiconductor element, and wherein
    the processor circuit is configured to determine, as the state determination unit, the state of the insulating film of the semiconductor element by considering a correlation between the element temperature acquired by the element temperature acquisition unit and a present time waveform of the gate voltage.

4. The state determination device according to claim 1, wherein
    the processor circuit is configured to calculate a drop amount of a gate voltage from a normal waveform to an abnormal waveform and determine, as the state determination unit, the state of the insulating film of the semiconductor element based on the drop amount.

5. The state determination device according to claim 1, wherein
    the processor circuit is configured to calculate a number of pulses of a transitional waveform and determine, as the state determination unit, the state of the insulating film of the semiconductor element based on the number of pulses.

6. The state determination device according to claim 1, wherein
    the processor circuit is configured to determine, as the state determination unit, the state of the insulating film of the semiconductor element based on a flatness of the gate voltage in a stable waveform.

7. The state determination device according to claim 1, wherein
    the processor circuit is configured to determine, as the state determination unit, the state of the insulating film of the semiconductor element based on an average value of the gate voltage in a stable waveform.

8. The state determination device according to claim 1, wherein
    the processor circuit, as the state determination unit, is configured to determine the state of the insulating film of the semiconductor element based on a variance of the gate voltage in the stable waveform.

9. An apparatus comprising:
    an insulated gate type semiconductor element; and
    the state determination device according to claim 1 which determines a state of the semiconductor element.

10. A state determination device, comprising a processor circuit configured to:
    acquire, as a gate voltage waveform acquisition unit, a time waveform of a gate voltage during a switching operation of a semiconductor element having an insulated gate;
    store, as a past waveform storage unit, a past time waveform of the gate voltage acquired by the gate voltage waveform acquisition unit;

classify a current time waveform of the gate voltage acquired by the gate voltage waveform acquisition unit into one of four types including:
  a normal waveform which is an initial time waveform of the gate voltage,
  an abnormal waveform which is generated immediately after the normal waveform and has a waveform shape different from the normal waveform,
  a transitional waveform which has a waveform shape still unstable after the abnormal waveform, and
  a stable waveform which has a waveform stable shape after the transitional waveform; and
determine, as a state determination unit, a state of an insulating film of the semiconductor element based on which of the four types the current time waveform is classified as and by comparing the past time waveform of the gate voltage stored in the past waveform storage unit and the current time waveform of the gate voltage acquired by the gate voltage waveform acquisition unit.

\* \* \* \* \*